United States Patent
Berardi

(10) Patent No.: US 9,841,127 B2
(45) Date of Patent: *Dec. 12, 2017

(54) GARDEN HOSE DEVICE AND METHOD

(71) Applicant: Blue Gentian, LLC, Palm Beach Gardens, FL (US)

(72) Inventor: Michael J. Berardi, Palm Beach Gardens, FL (US)

(73) Assignee: Blue Gentian, LLC, Palm Beach Gardens, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/440,841

(22) Filed: Feb. 23, 2017

(65) Prior Publication Data

US 2017/0159851 A1 Jun. 8, 2017

Related U.S. Application Data

(60) Division of application No. 15/055,095, filed on Feb. 26, 2016, now Pat. No. 9,581,272, which is a
(Continued)

(51) Int. Cl.
*F16L 11/00* (2006.01)
*F16L 11/12* (2006.01)
(Continued)

(52) U.S. Cl.
CPC .............. *F16L 11/12* (2013.01); *F16L 33/01* (2013.01); *F16L 55/1018* (2013.01)

(58) Field of Classification Search
CPC .. F16L 11/04; F16L 11/00; F16L 11/12; F16L 33/01
(Continued)

(56) References Cited

U.S. PATENT DOCUMENTS 25,239 A 8/1859 Boyd
31,614 A 3/1861 Mayall
(Continued)

FOREIGN PATENT DOCUMENTS

CA 2779882 8/2012
CN 1266155 9/2000
(Continued)

OTHER PUBLICATIONS

Anonymous, Slastix Loops korkotel—R-med webaruhaz, YouTube Internet video product demonstration, URL: https://www.youtube.com/watch?v=aT4kbfjANR0, (retrieved Nov. 25, 2013).
(Continued)

*Primary Examiner* — Patrick F Brinson
(74) *Attorney, Agent, or Firm* — McHale & Slavin, P.A.

(57) ABSTRACT

A flexible hose having an inner tube member made from a thermoplastic elastomeric material and an outer tube member made from a fabric like material. The inner tube member is secured to the outer tube member only at an inlet coupler and an outlet coupler. The inlet coupler is constructed to secure to a water supply provided from a conventional household water spigot. The outlet coupler incorporates a flow restrictor allowing the inner tube member to equalize in pressure with pressurized water received from the water supply. Pressurized water expands the elongated inner tube member longitudinally along a length of the inner tube member and laterally across a width of the inner tube member thereby substantially increasing the length of the hose to an expanded condition wherein the hose contracts to a substantially decreased length when there is a decrease in pressurized water.

4 Claims, 8 Drawing Sheets

Related U.S. Application Data continuation of application No. 14/301,825, filed on Jun. 11, 2014, now Pat. No. 9,279,525, which is a continuation of application No. 13/859,511, filed on Apr. 9, 2013, now Pat. No. 8,757,213, which is a continuation-in-part of application No. 13/690,670, filed on Nov. 30, 2012, now Pat. No. 8,479,776, which is a continuation-in-part of application No. 13/654,832, filed on Oct. 18, 2012, now abandoned, which is a continuation-in-part of application No. 13/488,515, filed on Jun. 5, 2012, now Pat. No. 8,291,942, which is a continuation-in-part of application No. 13/289,447, filed on Nov. 4, 2011, now Pat. No. 8,291,941.

(51) Int. Cl.
  *F16L 33/01* (2006.01)
  *F16L 55/10* (2006.01)

(58) Field of Classification Search
  USPC .......... 138/118, 119, 109, 46; 239/195–198, 239/208, 281, 280.5, 394, 443, 581.1, 239/526; 15/327.1–327.7; 285/247–249, 285/255
  See application file for complete search history.

(56) References Cited

U.S. PATENT DOCUMENTS

| | | |
|---|---|---|
| 79,220 A | 6/1868 | Forsyth et al. |
| 126,069 A | 4/1872 | McBurney |
| 411,829 A | 10/1889 | Nachtrieb |
| 543,220 A | 7/1895 | Ross |
| 674,045 A | 5/1901 | Sullivan |
| 834,074 A | 10/1906 | Patterson |
| 919,444 A | 4/1909 | Loetzer |
| 935,086 A | 9/1909 | Baird |
| 989,534 A | 4/1911 | MacDuffee |
| 1,179,374 A | 4/1916 | Many |
| 1,220,661 A | 3/1917 | Many |
| 1,288,148 A | 12/1918 | Oden |
| 1,301,354 A | 4/1919 | Baird |
| 1,756,698 A | 4/1930 | Oden |
| 1,993,617 A | 3/1935 | Nason |
| 2,076,632 A | 4/1937 | Goodall |
| 2,097,862 A | 11/1937 | McKay |
| 2,102,010 A | 12/1937 | Kopp |
| 2,464,416 A | 3/1949 | Raybould |
| 2,467,520 A | 4/1949 | Brubaker |
| 2,470,538 A | 5/1949 | Wolfram et al. |
| 2,475,591 A | 7/1949 | Chernack |
| 2,634,071 A | 4/1953 | Lund |
| 2,814,529 A | 11/1957 | Arnt |
| 2,841,529 A | 7/1958 | Schmidt et al. |
| 2,858,854 A | 11/1958 | Daggett |
| 2,922,667 A | 1/1960 | Lanciano |
| 2,978,262 A | 4/1961 | Franck |
| 3,035,779 A | 5/1962 | Convis |
| 3,056,429 A | 10/1962 | Wilberg |
| 3,073,301 A | 1/1963 | Hay et al. |
| 3,205,913 A | 9/1965 | Ehlers |
| D206,236 S | 11/1966 | Seckel et al. |
| 3,315,674 A | 4/1967 | Bloom et al. |
| D215,002 S | 8/1969 | Bauman |
| 3,481,368 A | 12/1969 | Vansickle et al. |
| 3,520,725 A | 7/1970 | Hamrick |
| 3,524,779 A | 8/1970 | Masters et al. |
| 3,530,900 A | 9/1970 | Kish |
| 3,682,202 A | 8/1972 | Buhrmann et al. |
| 3,726,321 A | 4/1973 | Phillips et al. |
| 3,830,531 A | 8/1974 | Burge |
| 3,831,635 A | 8/1974 | Burton |
| 3,856,051 A | 12/1974 | Bain |
| 3,861,424 A | 1/1975 | Mizutani |
| 3,886,029 A | 5/1975 | Poulsen |
| 3,928,979 A | 12/1975 | Terashima et al. |
| 3,966,121 A | 6/1976 | Littman |
| 3,980,325 A | 9/1976 | Robertson |
| 4,009,734 A | 3/1977 | Sullivan |
| 4,081,302 A | 3/1978 | Drostholm et al. |
| RE29,613 E | 4/1978 | Kropfhammer |
| 4,091,063 A | 5/1978 | Logan |
| 4,111,237 A | 9/1978 | Mutzner et al. |
| 4,140,154 A | 2/1979 | Kanao |
| 4,154,237 A | 5/1979 | Courter |
| 4,276,908 A | 7/1981 | Horne |
| 4,308,896 A | 1/1982 | Davis |
| 4,385,629 A | 5/1983 | Wolf, Jr. et al. |
| 4,394,861 A | 7/1983 | Sciortino |
| 4,404,969 A | 9/1983 | Cresswell et al. |
| 4,445,543 A | 5/1984 | Mead |
| 4,467,837 A | 8/1984 | Baker |
| 4,478,661 A | 10/1984 | Lewis |
| 4,553,568 A | 11/1985 | Piccoli et al. |
| 4,643,229 A | 2/1987 | Hickin |
| 4,657,049 A | 4/1987 | Fourty et al. |
| 4,669,757 A | 6/1987 | Bartholomew |
| 4,683,917 A | 8/1987 | Bartholomew |
| 4,736,969 A | 4/1988 | Fouts |
| 4,794,912 A | 1/1989 | Lia |
| 4,805,942 A | 2/1989 | Goodridge |
| 4,844,000 A | 7/1989 | Clement |
| 4,895,185 A | 1/1990 | Champleboux et al. |
| 4,895,189 A | 1/1990 | Alemanni |
| 4,915,106 A | 4/1990 | Aulgur et al. |
| 4,989,643 A | 2/1991 | Walton et al. |
| 5,023,959 A | 6/1991 | Mercer |
| 5,036,890 A | 8/1991 | Whaley |
| 5,112,087 A | 5/1992 | Haruki |
| 5,148,836 A | 9/1992 | Lawrence |
| 5,158,005 A | 10/1992 | Negishi et al. |
| 5,246,254 A | 9/1993 | LoJacono, Jr. et al. |
| 5,264,262 A | 11/1993 | Igarashi |
| 5,286,068 A | 2/1994 | Wiebe |
| 5,316,348 A | 5/1994 | Franklin |
| 5,477,888 A | 12/1995 | Mezzalira |
| 5,538,513 A | 7/1996 | Okajima |
| 5,555,915 A | 9/1996 | Kanao |
| 5,558,375 A | 9/1996 | Newman |
| 5,607,107 A | 3/1997 | Grieve et al. |
| 5,664,566 A | 9/1997 | McDonald et al. |
| 5,816,622 A | 10/1998 | Carter |
| 5,894,866 A | 4/1999 | Horst et al. |
| 5,915,735 A | 6/1999 | Noble |
| 5,918,642 A | 7/1999 | Akedo et al. |
| 5,947,116 A | 9/1999 | Gamow et al. |
| 5,954,052 A | 9/1999 | McDonald et al. |
| 5,957,132 A | 9/1999 | McDonald et al. |
| 6,024,132 A | 2/2000 | Fujimoto |
| 6,024,134 A | 2/2000 | Akedo et al. |
| 6,065,944 A | 5/2000 | Cobb |
| 6,070,580 A | 6/2000 | McDonald et al. |
| 6,098,666 A | 8/2000 | Wells et al. |
| 6,103,971 A | 8/2000 | Sato et al. |
| 6,192,940 B1 | 2/2001 | Koma et al. |
| 6,202,263 B1 | 3/2001 | Harker |
| 6,209,800 B1 | 4/2001 | Thomas |
| 6,223,777 B1 | 5/2001 | Smith et al. |
| 6,305,428 B1 | 10/2001 | Nakamura et al. |
| 6,408,848 B1 | 6/2002 | Feldman et al. |
| 6,443,155 B1 | 9/2002 | McDonald et al. |
| 6,446,661 B2 | 9/2002 | Armenia et al. |
| 6,523,539 B2 | 2/2003 | McDonald et al. |
| 6,568,610 B1 | 5/2003 | Ericksen |
| 6,659,366 B1 | 12/2003 | Walters |
| D485,744 S | 1/2004 | Khubani |
| 6,672,307 B2 | 1/2004 | McDonald et al. |
| 6,698,457 B2 | 3/2004 | Hayashi et al. |
| 6,749,233 B2 | 6/2004 | Ohya |
| 6,769,452 B2 | 8/2004 | Qutub et al. |
| 6,787,491 B2 | 9/2004 | Braekevelt |
| 6,948,527 B2 | 9/2005 | Ragner et al. |

(56) References Cited

U.S. PATENT DOCUMENTS

| | | | |
|---|---|---|---|
| 6,955,189 B1 | 10/2005 | Weyker | |
| 6,983,757 B1 | 1/2006 | Becker et al. | |
| 7,021,339 B2 | 4/2006 | Hagiwara et al. | |
| 7,178,526 B2 | 2/2007 | McDonald et al. | |
| D552,720 S | 10/2007 | Salatino et al. | |
| 7,302,972 B1 | 12/2007 | Stowe | |
| 7,306,012 B2 | 12/2007 | Stockton et al. | |
| D586,435 S | 2/2009 | Reckseen | |
| 7,549,448 B2 | 6/2009 | Ragner | |
| 7,617,762 B1 | 11/2009 | Ragner | |
| D605,737 S | 12/2009 | von Glanstaetten et al. | |
| 7,640,620 B2 | 1/2010 | Stockton | |
| 7,735,523 B2 | 6/2010 | Smith et al. | |
| 7,794,374 B1 | 9/2010 | Park | |
| 8,056,584 B2 | 11/2011 | Burrowes et al. | |
| 8,151,796 B2 | 4/2012 | McDonald et al. | |
| 8,291,941 B1 | 10/2012 | Berardi | |
| 8,291,942 B2 | 10/2012 | Berardi | |
| 8,479,776 B2 * | 7/2013 | Berardi | F16L 11/00 138/109 |
| 8,757,213 B2 * | 6/2014 | Berardi | F16L 11/00 138/109 |
| 8,776,836 B2 | 7/2014 | Ragner et al. | |
| 9,279,525 B2 * | 3/2016 | Berardi | F16L 11/00 |
| 9,581,272 B2 * | 2/2017 | Berardi | F16L 11/00 |
| 2002/0013974 A1 | 2/2002 | Gibson et al. | |
| 2003/0000530 A1 | 1/2003 | McDonald et al. | |
| 2003/0094207 A1 | 5/2003 | Qutub et al. | |
| 2004/0194781 A1 | 10/2004 | Fukunaga et al. | |
| 2004/0231096 A1 | 11/2004 | Battle et al. | |
| 2005/0246855 A1 | 11/2005 | Stockton et al. | |
| 2009/0277525 A1 | 11/2009 | Jourdan | |
| 2009/0301593 A1 | 12/2009 | Zucchi et al. | |
| 2010/0071795 A1 | 3/2010 | Montalvo et al. | |
| 2010/0089479 A1 | 4/2010 | Smith et al. | |
| 2012/0210752 A1 | 8/2012 | Ragner | |
| 2012/0234425 A1 | 9/2012 | Berardi | |
| 2013/0087205 A1 | 4/2013 | Berardi | |
| 2013/0113205 A1 | 5/2013 | Berardi | |
| 2014/0130930 A1 | 5/2014 | Ragner | |
| 2014/0230945 A1 | 8/2014 | Ragner | |

FOREIGN PATENT DOCUMENTS

| | | |
|---|---|---|
| CN | 2428670 Y | 5/2001 |
| CN | 2435609 Y | 6/2001 |
| CN | 202132621 U | 2/2012 |
| CN | 202228809 U | 5/2012 |
| CN | 202442051 U | 9/2012 |
| DE | 19542665 | 5/1997 |
| DE | 19752008 | 5/1999 |
| EP | 0039744 | 11/1981 |
| EP | 0214835 | 3/1987 |
| EP | 1176352 | 1/2002 |
| EP | 1271033 | 8/2004 |
| EP | 2395270 | 12/2011 |
| FR | 2582077 | 11/1986 |
| JP | 09112774 | 5/1997 |
| JP | 09217877 | 8/1997 |
| JP | 3059801 | 7/1999 |
| JP | D1104985 | 4/2001 |
| JP | 2001193882 | 7/2001 |
| JP | 2004069031 | 3/2004 |
| JP | 3180336 | 12/2012 |
| JP | 3181596 | 2/2013 |
| JP | 3183172 | 4/2013 |
| KR | 300301587 | 7/2002 |
| KR | 3020020000293 | 7/2002 |
| WO | WO9002582 | 3/1990 |
| WO | WO03010459 | 2/2003 |
| WO | WODM062658 | 3/2003 |

OTHER PUBLICATIONS

Anonymous, "Stroops Slastix Loop for Elastic Resistance Training and Leg Strengthening", YouTube Internet video product demonstration, URL: https://www.youtube.com/watch?v=LcsaX7CE1gg, (retrieved Nov. 25, 2013).

Anonymous, "Stroops slastix loop", Amazon.de, product, URL: http://www.amazon.de/s/ref=nb_sb_noss?_mk_de_DE=%C3%85M%C3%85%C5%BD%C3%95%C3%91&url=search-alias%3Daps&field-keywords=stroops%20slastix%20loop, (retrieved Nov. 25, 2013).

Anonymous, "Stroops slastix anneau de stroops", Amazon.fr, product, URL: http://www.amazon.fr/s/ref=nb_sb_noss?_mk_fr_FR=%C3%85M%C3%85%C5%BD%C3%95%C3%91&url=search-alias%3Daps&field-keywords=stroops%20slastix%20anneau, (retrieved Nov. 25, 2013).

Anonymous, "Stroops slastix loop", Amazon.co.uk, product, URL: http://www.amazon.co.uk/s/ref=nb_sb_noss?url=search-alias%3Daps&field-keywords=stroops%20slastix%20loop, (retrieved Nov. 25, 2013).

Anonymous, "Cuff performance in Taiwan", Internet article, URL: http://www.cuffperformance.com/2010/01/cuff-performance-in-taiwan/, (Mar. 12, 2013 screen capture).

Anonymous, "Stroops Slastix toner", Amazon.fr, product, URL: http://www.amazon.fr/Stroops-Slastix-Toner-Jaune-clair/dp/B002ZCXP1W/ref=sr_1_sc_1?ie=UTF8&qid=1385401458&sr=8-1-spell&keywords=stroops+slastix+toner+jauneclair, (retrieved Nov. 25, 2013).

Anonymous, "Stroops slastix toner", Amazon.co.uk, product, URL: http://www.amazon.co.uk/Stroops-Slastix-Toner-Medium-Red/dp/B002ZCXP1W/ref=sr_1_1?ie=UTF8&qid=1385401730&sr=8-1&keywords=stroops+slastix+toner, (retrieved Nov. 25, 2013).

Anonymous, "Vitor Belfort using Stroops Toner with Fit Stik", YouTube Internet video product demonstration, URL: https://www.youtube.com/watch?v=LMp2LWOjwmM, (Jul. 17, 2010).

Anonymous, "Stroops Battle Ropes—MMA training and strength building", YouTube Internet video product demonstration, URL: https://www.youtube.com/watch?v=Ggclk7Hvu0g, (Oct. 12, 2011).

Anonymous, "Slastix by Stroops", YouTube Internet video product demonstration, URL: https://www.youtube.com/watch?v=d6cJYFpWOkM, (Sep. 7, 2011).

Anonymous, "Stroops slastix toner", Amazon.de, product, URL: https://www.youtube.com/watch?v=d6cJYFpWOkM, (retrieved Nov. 25, 2013).

Theresa, "Stroops the cat exercise device", Internet product review, URL: http://best-aerobic-exercises.blogspot.com/2011/06/stroops-cat-exercise-device.html, (Jun. 8, 2011).

Anonymous, "Stroops cat noir", Amazon.fr, product, URL: http://www.amazon.fr/Stroops-970099-Cat-Noir/dp/B002ZCXPJ4/ref=sr_1_1?ie=UTF8&qid=1385405677&sr=8-1&keywords=stroops+cat+noir (retrieved Nov. 25, 2013).

Anonymous, "Stroops cat, schwarz", Amazon.de, product, URL: http://www.amazon.de/Stroops-970099-Cat-Noir/dp/B002ZCXPJ4/ref=sr_1_1?ie=UTF8&qid=1385405677&sr=8-1&keywords=stroops+cat+noir, (retrieved Nov. 25, 2013).

Anonymous, "Stroops—Cat, Fasce per resistenza, colore: Nero", Amazon.it, product, URL: http://www.amazon.it/Stroops-970099-Cat-Noir/dp/B002ZCXPJ4/ref=sr_1_1?ie=UTF8&qid=1385405677&sr=8-1&keywords=stroops+cat+noir, (retrieved Nov. 25, 2013).

Anonymous, "Stroops MMA 50-0023 Anaconda Équipement de résistance fitness Orange 35 kg", Amazon.fr, product, URL: http://www.amazon.fr/s/ref=nb_sb_noss?_mk_fr_FR=%C3%85M%C3%85%C5%BD%C3%95%C3%91&url=search-alias%3Daps&field-keywords=stroops%20mma%2050-0023, (retrieved Nov. 25, 2013).

Anonymous, "Stroops MMA fitnessgerat anaconda", Amazon.de, product, URL: http://www.amazon.de/Stroops-MMA-Fitnessger%C3%A4t-Anaconda-50-0023/dp/B005LUP6PS/ref=sr_1_sc_1?ie=UTF8&qid=1385406392&sr=8-1-spell&keywords=stroops+mma+fitnessgerat+anaconda, (retrieved Nov. 25, 2013).

(56) References Cited

OTHER PUBLICATIONS

Anonymous, "The perfect garden hose", JGB Enterprises, Inc., Internet Article, http://www.jgbhose.com/PGH/news-reviews-testimonials/Does-Tuff-Guard-Hose-Really-Work.html., (retrieved Oct. 15, 2013).

Anonymous, "QVC to air Tuff Guard's the perfect garden hose during their march 2012 spring in bloom garden special series!", JGB Enterprises, Inc., Internet Article, http://www.jgbhose.com/JGB-news/QVC-to-Air-TUFF-GUARDs-The-Perfect-Garden-Hose.asp. (retrieved Oct. 15, 2013).

Anonymous, "Slastix toner exercise tubing with safety sleeve", Power Systems, Inc., Internet Article, http://www.power-systems.com/p-2030-slastix-toner-resistance-tubing.aspx., (retrieved Oct. 15, 2013).

Telebrands Contentions, Civil Action No. 12-06671-FSH-JBC, U.S. District Court, District of New Jersey, Telebrands Corp.'s Invalidity Contentions Pursuant to local patent rule 3.3, (Jan. 20, 2014).

Exhibit A 941 McDonald, Telebrand Contentions, Civil Action No. 12-06671-FSH-JBC, U.S. District Court, District of New Jersey, Telebrands Corp.'s Invalidity Contentions Pursuant to local patent rule 3.3, (Jan. 20, 2014).

Exhibit B 941 Many, Telebrand Contentions, Civil Action No. 12-06671-FSH-JBC, U.S. District Court, District of New Jersey, Telebrands Corp.'s Invalidity Contentions Pursuant to local patent rule 3.3, (Jan. 20, 2014).

Exhibit C 942 McDonald, Telebrand Contentions, Civil Action No. 12-06671-FSH-JBC, U.S. District Court, District of New Jersey, Telebrands Corp.'s Invalidity Contentions Pursuant to local patent rule 3.3, (Jan. 20, 2014).

Exhibit D 942 Many, Telebrand Contentions, Civil Action No. 12-06671-FSH-JBC, U.S. District Court, District of New Jersey, Telebrands Corp.'s Invalidity Contentions Pursuant to local patent rule 3.3, (Jan. 20, 2014).

Exhibit E 776 McDonald, Telebrand Contentions, Civil Action No. 12-06671-FSH-JBC, U.S. District Court, District of New Jersey, Telebrands Corp.'s Invalidity Contentions Pursuant to local patent rule 3.3, (Jan. 20, 2014).

Exhibit F 776 Many, Telebrand Contentions, Civil Action No. 12-06671-FSH-JBC, U.S. District Court, District of New Jersey, Telebrands Corp.'s Invalidity Contentions Pursuant to local patent rule 3.3, (Jan. 20, 2014).

Exhibit G 941 McDonald, Telebrand Contentions, Civil Action No. 12-06671-FSH-JBC, U.S. District Court, District of New Jersey, Telebrands Corp.'s Invalidity Contentions Pursuant to local patent rule 3.3, (Jan. 20, 2014).

Exhibit H 941 Ragner, Telebrand Contentions, Civil Action No. 12-06671-FSH-JBC, U.S. District Court, District of New Jersey, Telebrands Corp.'s Invalidity Contentions Pursuant to local patent rule 3.3, (Jan. 20, 2014).

Exhibit I 941 Definition of Hose, Telebrand Contentions, Civil Action No. 12-06671-FSH-JBC, U.S. District Court, District of New Jersey, Telebrands Corp.'s Invalidity Contentions Pursuant to local patent rule 3.3, (Jan. 20, 2014).

Exhibit J 942 McDonald, Telebrand Contentions, Civil Action No. 12-06671-FSH-JBC, U.S. District Court, District of New Jersey, Telebrands Corp.'s Invalidity Contentions Pursuant to local patent rule 3.3, (Jan. 20, 2014).

Exhibit K 942 Ragner, Telebrand Contentions, Civil Action No. 12-06671-FSH-JBC, U.S. District Court, District of New Jersey, Telebrands Corp.'s Invalidity Contentions Pursuant to local patent rule 3.3, (Jan. 20, 2014).

Exhibit L Definition of Hose, Telebrand Contentions, Civil Action No. 12-06671-FSH-JBC, U.S. District Court, District of New Jersey, Telebrands Corp.'s Invalidity Contentions Pursuant to local patent rule 3.3, (Jan. 20, 2014).

Exhibit M 776 McDonald, Telebrand Contentions, Civil Action No. 12-06671-FSH-JBC, U.S. District Court, District of New Jersey, Telebrands Corp.'s Invalidity Contentions Pursuant to local patent rule 3.3, (Jan. 20, 2014).

Exhibit N 776 Ragner, Telebrand Contentions, Civil Action No. 12-06671-FSH-JBC, U.S. District Court, District of New Jersey, Telebrands Corp.'s Invalidity Contentions Pursuant to local patent rule 3.3, (Jan. 20, 2014).

Exhibit O 776 Definition of Hose, Telebrand Contentions, Civil Action No. 12-06671-FSH-JBC, U.S. District Court, District of New Jersey, Telebrands Corp.'s Invalidity Contentions Pursuant to local patent rule 3.3, (Jan. 20, 2014).

Exhibit P List of Prior Art, Telebrand Contentions, Civil Action No. 12-06671-FSH-JBC, U.S. District Court, District of New Jersey, Telebrands Corp.'s Invalidity Contentions Pursuant to local patent rule 3.3, (Jan. 20, 2014).

Tristar Contentions, Civil Action No. 2:13-CV-07099-FSH-JBC, U.S. District Court, District of New Jersey, Tristar Products, Inc.'s invalidity contentions pursuant to local patent rule 3.3, (Jan. 20, 2014).

Exhibit A, Tristar Contentions, Civil Action No. 2:13-CV-07099-FSH-JBC, U.S. District Court, District of New Jersey, Tristar Products, Inc.'s invalidity contentions pursuant to local patent rule 3.3, (Jan. 20, 2014).

Exhibit B, Tristar Contentions, Civil Action No. 2:13-CV-07099-FSH-JBC, U.S. District Court, District of New Jersey, Tristar Products, Inc.'s invalidity contentions pursuant to local patent rule 3.3, (Jan. 20, 2014).

Exhibit C, Tristar Contentions, Civil Action No. 2:13-CV-07099-FSH-JBC, U.S. District Court, District of New Jersey, Tristar Products, Inc.'s invalidity contentions pursuant to local patent rule 3.3, (Jan. 20, 2014).

Exhibit D, Tristar Contentions, Civil Action No. 2:13-CV-07099-FSH-JBC, U.S. District Court, District of New Jersey, Tristar Products, Inc.'s invalidity contentions pursuant to local patent rule 3.3, (Jan. 20, 2014).

Exhibit E, Tristar Contentions, Civil Action No. 2:13-CV-07099-FSH-JBC, U.S. District Court, District of New Jersey, Tristar Products, Inc.'s invalidity contentions pursuant to local patent rule 3.3, (Jan. 20, 2014).

Exhibit F, Tristar Contentions, Civil Action No. 2:13-CV-07099-FSH-JBC, U.S. District Court, District of New Jersey, Tristar Products, Inc.'s invalidity contentions pursuant to local patent rule 3.3, (Jan. 20, 2014).

Exhibit G, Tristar Contentions, Civil Action No. 2:13-CV-07099-FSH-JBC, U.S. District Court, District of New Jersey, Tristar Products, Inc.'s invalidity contentions pursuant to local patent rule 3.3, (Jan. 20, 2014).

Exhibit H, Tristar Contentions, Civil Action No. 2:13-CV-07099-FSH-JBC, U.S. District Court, District of New Jersey, Tristar Products, Inc.'s invalidity contentions pursuant to local patent rule 3.3, (Jan. 20, 2014).

*Blue Gentian, LLC and National Express, Inc. v. Tristar Products, Inc.*, Civil Action No. 13-1758 (FSH) (JBC), Third amended complaint for patent infringement, (Nov. 19, 2014).

*E. Mishan & Sons, Inc. and Blue Gentian, LLC v. Supertek Canada Inc.*, International Edge , Inc. and Telebrands Corp., Citation No. 2014 FC 326, Federal Court, Toronto, Ontario, (Apr. 7, 2014).

*Blue Gentian LLC and Brand Developers Aust Pty Ltd* (ACN 115 139 565) v. *Product Management Group Pty Ltd* (ACN 131 987 034); Product Management Group Pty Ltd (ACN 131 987 034); Blue Gentian LLC and Brand Developers Aust Pty Ltd (ACN 115 139 565), Citation: *Blue Gentian LLC v Product Vlanagement Group Pty Ltd* [2014] FCA 1331, File No. 317 of 1331, Federal Court of Australia, (Dec. 8, 2014).

*Blue Gentian LLC and E. Mishan & Sons, Inc. Trading as Emson v. Tristar Products (UK) Limited and Tristar Products Inc.*, Neutral Citation No. [2013] EWHC 4098 (Pat), Case No. HP13E03325, In the High Court of Justice Chancery Division patents court, Royal Courts of Justice, London, England, (Dec. 20, 2013).

Reply to Exam Report of Mar. 13, 2014, Wilson Gunn Assoc, EP Application No. 12275110.0, Expandable Hose Assembly, Submission No. 2811600, European Patent Office, (Jun. 9, 2014).

*Blue Gentian, LLC and National Express, Inc. v. Wal-Mart Stores, Inc., The Walgreen Company, Family Dollar Stores, Inc., and HSN,*

(56) References Cited

OTHER PUBLICATIONS

*Inc.*, Amended Complaint for Patent Infringement, Civil Action No. 13-4627 (FSH) (JBC), U.S. District Court of New Jersey, (Nov. 19, 2014).
*Blue Gentian, LLC and National Express, Inc. v. Wal-Mart Stores, Inc., d/b/a Sam's Club and Sam's Wholesale Club*, Second Amended Complaint for Patent Infringement, Civil Action No. 13-7099 (FSH) (JBC), U.S. District Court of New Jersey, (Nov. 19, 2014).
*Telebrands Corp. v. Blue Gentian, LLC and National Express, Inc.*, Second Amended Complaint, Civil Action No. 2:12-CV-06671-FSH-JBC, U.S. District Court of New Jersey, (Nov. 26, 2014).
Notice of Pending Litigation, Commercial Hose, McHale & Slavin, P.A. Matter No. 4082U.022.
ID146676 Blue Gentian, Expandable Hose Assembly, Canada.
Anonymous, "Dust Right Expandable Hose", Internet Article One, http://www.rockler.com/product.cfm?page=21316, Rockler Woodworking Tools, (retrieved Apr. 10, 2013).
Anonymous, "Dust Right Expandable Hose", Internet Article Two, http://www.rockler.com/product.cfm?page=21316, Rockler Woodworking Tools, (retrieved May 15, 2013).
Anonymous, "Elastic resistance training system in the UG store", Mixed martial arts forum, product, URL: http://www.mixedmartialarts.com?go=forum.posts&thread=1980399&forum=1, (Apr. 2, 2012).
Anonymous, "Gardena 8677-20 comfort-schlauch 13mm -1/2, 30 meter", Amazon.de, product, URL: http:www.amazon.de/Gardena-8677-20-comfort-schlauch-13-meter/dp/B000OY07WS, (retrieved Nov. 20, 2013).
Anonymous, "Garden Hose", Wikipedia.org, URL: http://simple.wikipedia.org/wiki/File:Garden_hose.jpg, (retrieved Nov. 20, 2013).
Liszewski, A., "Pirit heated hose", Internet article: URL: http://www.ohgizmo.com/?s=heated+hose, (retrieved Nov. 20, 2013).
Anonymous, "Gardena 1969-20 perl-regner 15,0 m mit armaturen", Amazon.de, product, URL: http://www.amazon.de/gardena-1969-20-Perl-Regner-mit-Armaturen/dp/Booo1E3TB2/ref=sr_1_25?s=garden&ie=UTF8&qid=1362765470&sr=1-25, (retrieved Mar. 12, 2013).
Gannon, M., "Hose protection", Hydraulics & pneumatics, Internet article, URL: http://hydraulicspneumatics.com/products/hose-protection, (retrieved Nov. 22, 2013).
Anonymous, "Gaiam covered medium resistance workout kit", YouTube Internet video product demonstration, URL: http://youtube.com/watch?v=FeOkHbcXbA4, (retrieved Nov. 25, 2013).
Anonymous, "Covered resistance cord kit—light", Barnes & Noble, product, URL: http://www.barnesandnoble.com/w/dvd-covered-resistance-cord-kit-medium/14973179?ean=18713528650, (retrieved Nov. 25, 2013).
Anonymous, "Covered resistance cord kit—light DVD", Amazon.co.uk, product, URL: http://www.amazon.co.uk/Covered-Resistance-Cord-Kit-Region/dp/B0015RDJZ0/ref=sr_1_3?ie=UTF8&qid=1385416290&sr=8-3&keywords=covered+resistance+cord+kit, (retrieved Nov. 25, 2013).
Anonymous, "Gaiam kit tube de resistance avec cordon et DVD faible resistance", Amazon.fr, product, URL: http://www.amazon.fr/Gaiam-tube-r%C3%A9sistance-cordon-Faible/dp/B0003AZZ8Y0/ref=sr_1_1?ie =UFT8&qid=1362763409&sr=8-1, (Mar. 12, 2013 screen capture).
Roberts, A., "Gaiam covered resistance cord kit with DVD", Fitsugar.com, product, URL: http:www.fitsugar.com/Gaiam-resistance-cord-review-20378682, (Nov. 14, 2011).
Anonymous, "Gaiam TG05 covered resistance cord kit", Amazon.co.uk, product, URL: http://www.amazon.co.uk/Covered-Resistance-Cord-Kit-Region/dp/B0015RDJZ0/ref=sr_1_fkmr0_3?ie=UTF8&qid=1385415911&sr=8-3-fkmr0&keywords=gaiam+tg05+covered+resistance+cord+kit, (retrieved Nov. 25, 2013).

\* cited by examiner

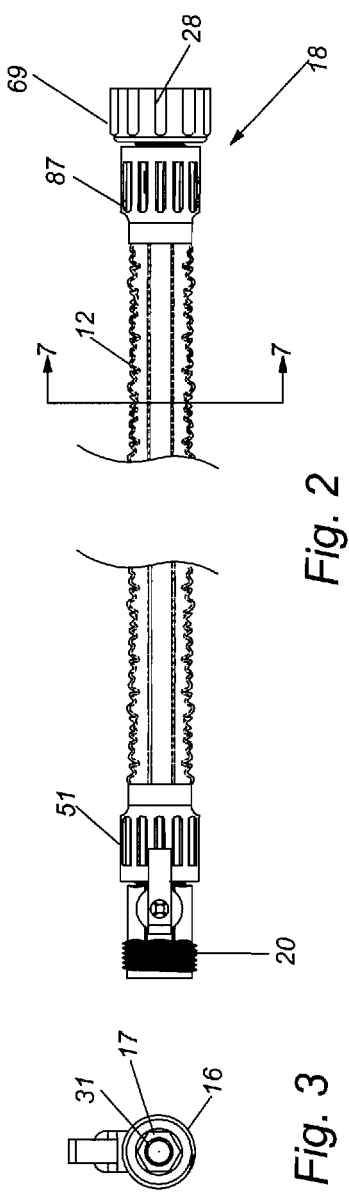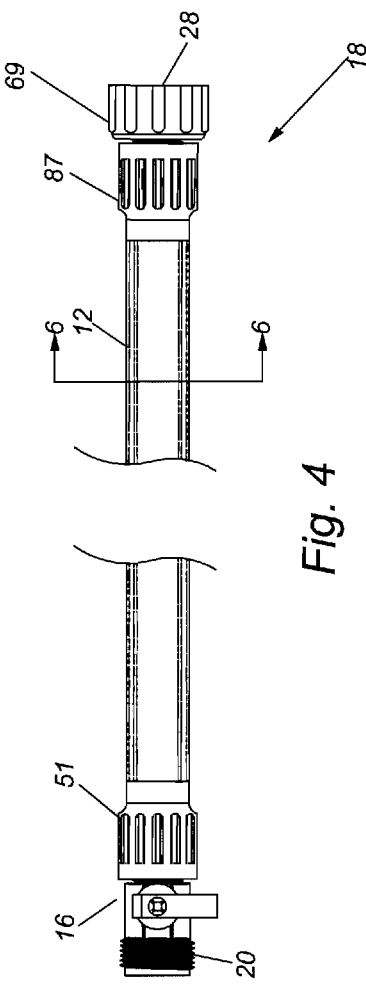

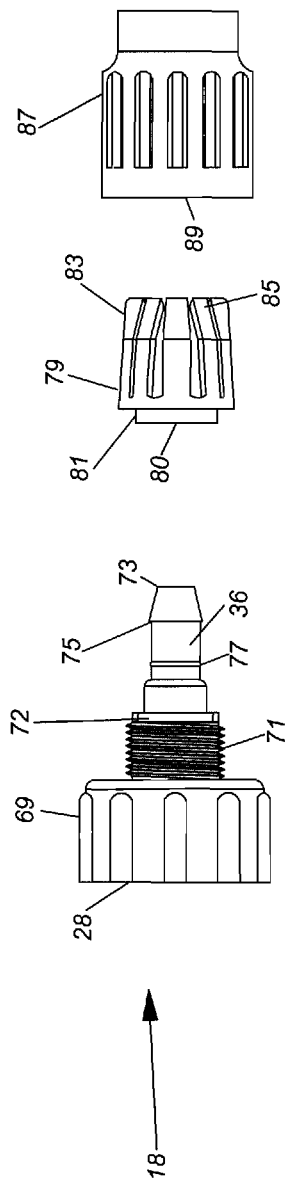
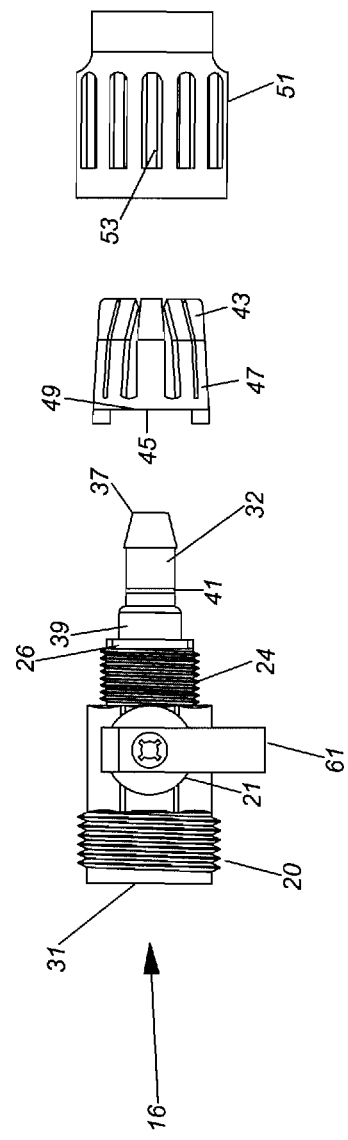
Fig. 11
Fig. 10

GARDEN HOSE DEVICE AND METHOD

PRIORITY CLAIM

In accordance with 37 C.F.R. 1.76, a claim of priority is included in an Application Data Sheet filed concurrently herewith. Accordingly, the present invention claims priority as a divisional of U.S. patent application Ser. No. 15/055,095 entitled "Commercial Hose" filed Feb. 26, 2016 and to issue on Feb. 28, 2017 as U.S. Pat. No. 9,581,272 which claims priority as a continuation of U.S. patent application Ser. No. 14/301,825 entitled "Commercial Hose" filed Jun. 11, 2014 and issued on Mar. 8, 2016 as U.S. Pat. No. 9,279,525, which is a continuation of U.S. patent application Ser. No. 13/859,511, entitled "Commercial Hose", filed Apr. 9, 2013, and issued Jun. 24, 2014 as U.S. Pat. No. 8,757,213; which is a continuation-in-part of U.S. patent application Ser. No. 13/690,670, entitled "Expandable Garden Hose", filed Nov. 30, 2012, and issued Jul. 9, 2013 as U.S. Pat. No. 8,479,776; which is a continuation-in-part of U.S. patent application Ser. No. 13/654,832, entitled "Expandable Hose Assembly Coupling Member", filed Oct. 18, 2012, and now abandoned; which is a continuation-in-part of U.S. patent application Ser. No. 13/488,515, entitled "Expandable Hose Assembly", filed Jun. 5, 2012, and issued Oct. 23, 2012 as U.S. Pat. No. 8,291,942; which is a continuation-in-part of U.S. patent application Ser. No. 13/289,447, entitled "Expandable and Contractible Hose", filed Nov. 4, 2011, and issued Oct. 23, 2012 as U.S. Pat. No. 8,291,941; the contents of the above referenced patents are incorporated herein by reference.

FIELD OF THE INVENTION

The present invention relates to the field of water hoses and in particular to a hose that expands when pressurized water is introduced and modulated by a flow restrictor positioned at the outlet of the hose.

BACKGROUND OF THE INVENTION

Conventional hoses are typically constructed from rubber or other resilient flexible material such as synthetic rubber, thermo plastic rubber or the like photochemical derivatives. A notable problem encountered with conventional garden hoses relates to the storage of the hose when not in use. Garden hoses can be stored on a hose reel, placed within a storage container, or simply left on the ground. While storage devices are practical in certain situations, in many instances the consumer cannot use or has no desire to employ a storage container. For example, a consumer may live in an apartment or small condo and would like to have the benefit of a garden hose for plant watering, car washing, or the like but does not have room for storage of a conventional garden hose. Another example would be the owner of a boat, RV or plane who may wish to leave the hose with the vehicle. Such places are impractical for hose conventional hoses.

There are many situations where it is beneficial to store a hose in as little a space as possible. If the consumer does not have a device for storing the hose then they must try to organize the hose on the ground in a way as to not entangle the hose within itself. If improperly organized, the hose will tend to kink when uncoiled. This problem is typically encountered by the average homeowner who uses the hose infrequently wherein improper storage of a hose can result in the development of kinks. Garden hoses can be made with thick sidewalls to prevent kinking but result in heavy and cumbersome water hoses. Fiber reinforcements can also be used, such as woven tapes or knitting followed by the addition of an outer coating, all of which add to the weight of a garden hose and do not have a shortened length for storage. For this reason, it is of great benefit to have a garden hose that is light in weight, contractible in length, and kink resistant.

Retractable hoses are known to use steel wires formed in a coiled shape with a vinyl tube, the steel wires wind through the vinyl tube so that it will normally be in a coiled or rolled configuration when not in use. When pressurized water is introduced into the hose, the hose is unwound. When the pressurized water is removed, the water hose is recoiled to a rolled position. Examples of such hoses include U.S. Pat. Nos. 2,814,529; 3,035,779 and 3,966,121.

U.S. Pat. No. 6,523,539 discloses a self elongating oxygen hose for stowable aviation crew oxygen mask. The supplemental gas assembly such as used for aircraft crews is provided which includes a mask adapted to fit over at least the nose and mouth of a wearer, together with a flexible, self-elongating hose assembly and a stowage box for receiving the mask and hose assembly.

The transition zone between a garden hose and pressurized source of water, or the garden hose and delivery point, is accomplished by a coupling. Conventional couplings provide a fluid connection between a spigot and a garden hose. However the prior art fails to disclose a coupling capable of attaching to a flexible garden hose having an expandable inner tube member made of a flexible fluid carrying material and an outer sleeve made of a fixed length fabric material. For instance, U.S. Pat. No. 4,895,185 discloses a flexible hose reinforced by armature layers made of flexible cables disposed helically and is attached at least at one end by compression of said layers against rigid pieces, characterized by the supporting elements and gripping elements, which are coaxial, having non-adhesive conical compression surfaces which diverge toward the end and by at least one wedge provided with slits being driven between reinforcing layers to ensure compression. The tubular sleeve is attached to a rigid assembly wherein ends of the layered pairs are engaged in the conical annular space between the coaxial supporting element and gripping elements.

U.S. Pat. No. 5,816,622 discloses a garden hose having a protective shell section and a flexible strain relief section releasably attached to the shell section. The hose is sealably attached to a stem portion of a coupling by a brass ferrule, the manner by which the hose is attached to the stem portion is stated as being well known in the art. After the end of the hose having the ferrule slipped over the stem portion so that the end of the hose abuts the receive portion, a device is inserted into the stem portion for expanding it thereby sandwiching the hose between the stem portion and the ferrule for locking the hose to the coupling.

U.S. Pat. No. 5,894,866 discloses a garden hose assembly having a deformable section that allows a portion of the hose to be coiled around a support for holding the end of the hose in a desired position. Connectors have coupling stems which are inserted within a base tube and such coupling stems are then radially expanded into ferrules or corrugations.

U.S. Pat. No. 6,209,800 discloses a flexible tube formed so that adjacent coils are formed while in a contracted position, the tube is extendible by straightening of the coils. A fitting is formed from an elongate, substantially cylindrical externally barbed portion and a disk shaped head. A bore extends through the fitting which is smaller than the inner diameter of the tubing. The fitting portion is inserted into an end of the tube and held therein by an interference fit with barbs inhibiting removal axially of the tube.

U.S. Pat. No. 6,568,610 discloses a flexible water spray wand for connection to a standard garden hose, having a housing connectable at a lower end to the garden hose and at an upper end to a flexible tube assembly connected at an opposite end to a spray nozzle. The flexible tube has an outlet fitting which comprises an externally barbed portion and an externally threaded portion with an annular shoulder therebetween. The barbed portion fits snugly within outlet end portion of the hose with annular shoulder which abuts an outlet end portion of the ribbed tube, which can be affixed by silver soldering or adhesives.

U.S. Pat. Nos. 6,948,527 and 7,549,448 disclose a linearly self-actuated hose for use in transporting fluids. A hose has a biasing spring that extends along the full length, and can comprise single or multiple springs and/or multiple diameter spring coils. The spring is covered with hose cover material on the outside and hose cover material on the inside to form a sealed hose and are bowed inward or outward radially between the individual spring coils depending on the intended use of hose. On the end of the hose is mounted a nozzle end which can be designed with standard garden hose threads. The nozzle end comprises an inner crimp ring, and outer crimp ring which also provides threads, and a water restriction ring. The hose can be trapped between crimp rings to provide a compression fit. Crimp rings are also crimped onto each other so that they form a right unit that will not fall apart during use.

U.S. Pat. No. 6,955,189 discloses a garden hose assembly that includes an elongated and flexible tubular member that includes an open first end, an open second end and a peripheral wall extending between the first and second open ends. A cross-section taken traversely to a longitudinal axis of the tubular member has a generally oblong shape when the tubular member is filled with a fluid and a substantially flattened shape when the tubular member is not filled with a fluid. Male and female couplers are defined as conventional hose couplers.

Therefore, what is needed in the art is a commercial grade flexible hose that can be coupled to a conventional water spigot and will extend in length when water is introduced into the hose and pressurized at an outlet of the hose.

SUMMARY OF THE INVENTION

Disclosed is a flexible hose that attaches to a conventional water spigot and will expand upon the presence of water that is pressurized within the hose, the expansion made possible by control of the water through use of a restrictor formed integral to the outlet of the hose. The hose can expand longitudinally by use of an elastic water proof inner tube member positioned within a soft fabric outer tube member.

Accordingly, it is an objective of the present invention to provide a hose that expands longitudinally and automatically expands laterally upon the application of water pressure as controlled by a flow restrictor positioned along an outlet of the hose.

It is a further objective of the present invention to provide a hose that automatically contracts upon release of water pressure from within the hose.

It is yet another objective of the present invention to provide a hose that is relatively light compared to a conventional non-expanding/non-contracting hose of a similar length.

It is a still further objective of the present invention to provide a hose that will not kink or become entangled upon itself when in use.

It is still a further objective of the present invention to provide a commercial grade coupling that is made of metal so that the coupling will operate under adverse working conditions.

Still a further objective of the present invention to provide a flow restrictor formed integral with an outlet coupling.

Other objectives and advantages of this invention will become apparent from the following description taken in conjunction with any accompanying drawings wherein are set forth, by way of illustration and example, certain embodiments of this invention. Any drawings contained herein constitute a part of this specification and include exemplary embodiments of the present invention and illustrate various objects and features thereof.

BRIEF DESCRIPTION OF THE FIGURES

FIG. 2 is a longitudinal side view of the present invention in a contracted position;

FIG. 3 is an end view of the outlet coupling;

FIG. 4 is a longitudinal view of the present invention in an expanded position;

FIG. 5 is an end view of the inlet coupling;

FIG. 10 is an exploded view of the male outlet coupling with an integral flow restrictor;

FIG. 11 is an exploded view of the female inlet coupling;

DETAILED DESCRIPTION OF THE INVENTION

Figure 1:
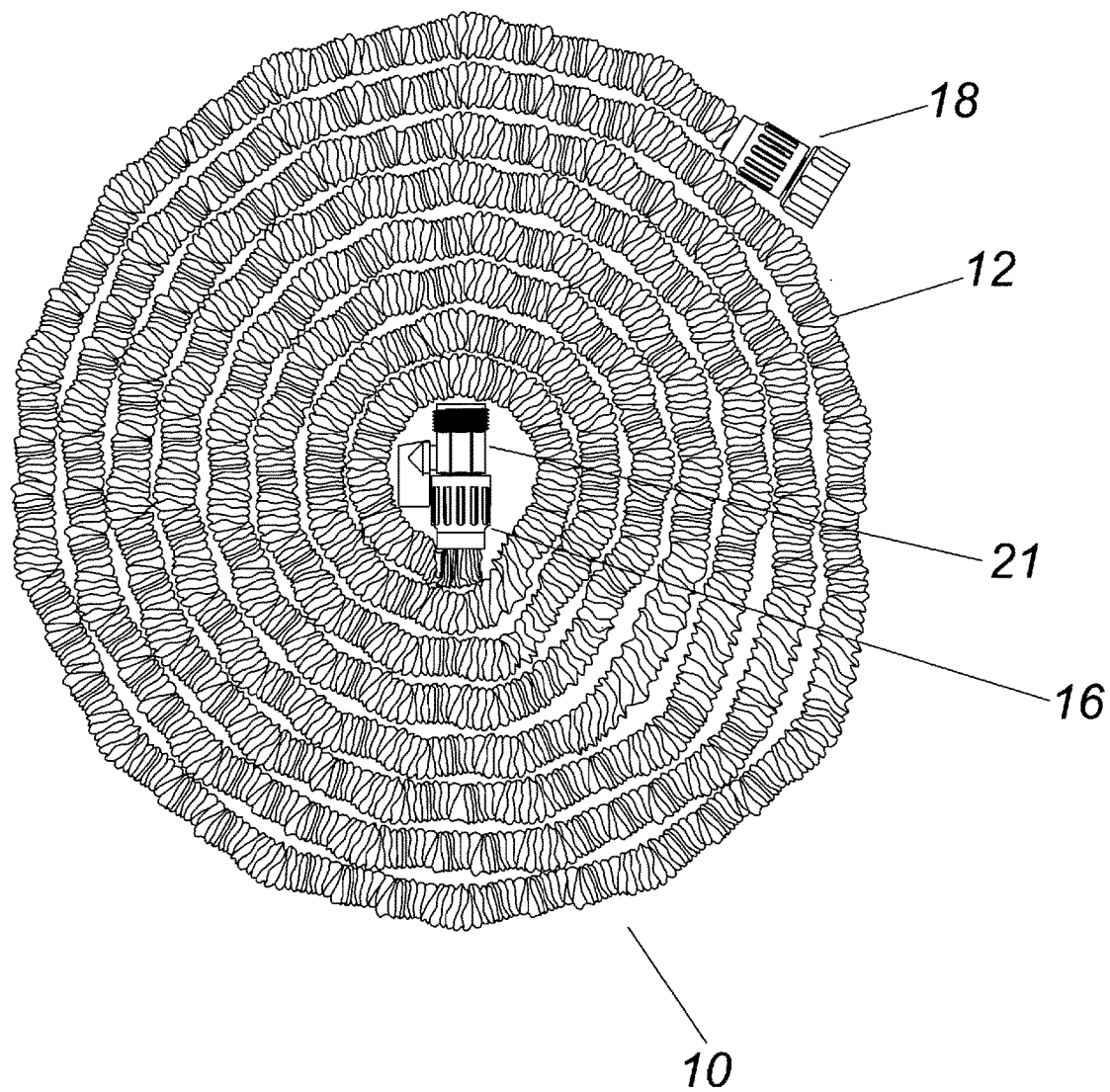
FIG. 1 is a plane view of a coiled flexible hose of the instant invention.

While the present invention is susceptible of embodiment in various forms, there is shown in the drawings and will hereinafter be described a presently preferred, albeit not limiting, embodiment with the understanding that the present disclosure is to be considered an exemplification of the present invention and is not intended to limit the invention to the specific embodiments illustrated.

Referring in general to the Figures, set forth is an expandable hose of the present invention. The hose is self-expanding upon the introduction of pressurized water within the hose, and self-contracting upon release of water from within the hose. The hose 10 is composed of two separate and distinct tubes, an inner tube member 14 formed from a thermoplastic elastomeric (TPE) or the like material which can expand 2 to 6 times its relaxed or unexpanded length, and outer tube member 12 formed from a relatively soft and bendable fabric webbing material. In the preferred embodiment the inner tube member 14 is a thermoplastic elastomer having elastic properties. The inner tube member 14 expands radially outwardly or laterally, with respect to its length. The radial expansion of the inner tube member 14 is constrained by the maximum diameter of the outer tube member 12. The preferred materials used to form the outer tube member 12 is a braided or woven polyester. The requirements of the outer tube member 12 material is that it be soft, bendable, and should be strong enough to withstand internal pressures to accommodate the highest water pressures typically found in a pump or municipal water supply with a safety factor of about 2.5. For example, while conventional pressure supplies are in the range of 30-60 psi, it is possible for a pump system to provide up to 100 psi. For this reason it is recommended that the inner and outer tube combination be capable of handling pressures up to 250 pounds per square inch, (psi). In the preferred embodiment, the thickness of the outer tube member is about 0.5 mm (0.02 inches) with a range of about 25% on thickness. Further, in the preferred embodiment the diameter of the outer tube when expanded is about 18-20 mm (0.07-0.082 inches) again with a range of about 25%.

The hose 10 employs a female inlet coupler 18 at a first end for connecting to a conventional water spigot and an outlet coupler 16 at a second end having an integrally formed flow restrictor and also connectable to a spray nozzle. The coupler members may be constructed from metal and assembled without tools. In the preferred embodiment the inlet coupler 18 includes a female threaded portion 28 rotatably attached to a first threaded annular collar 71. The female threaded portion 28 is constructed to receive the 12 male threads of a conventional water spigot 23, faucet or the like valve typically found on the exterior of a building. Most water faucets on buildings employ a standard size male coupler or fitting. A silicone gasket, not shown, can further provide a seal between the female threaded portion 28 and the water connection. The annular coupler 71 includes an inlet tubular extension section 36 extending therefrom having an end 73 insertable into a first open end of the inner tube member 14. A flow thru aperture 38 within the inlet coupler 18 allows water to flow through the coupler. The end 73 has an angular face that allows for ease of inserting into the first open end of the inner tube member 14 and may include a barb 75 that provides frictional engagement to the interior wall of the inner tube member 14. In addition to the barb 75, the use of an annular rib 77 enhances the engagement between the first end of the inner tube member 14 and the inlet tubular extension section 36. In the preferred embodiment, the coupler is constructed from plastic, brass, stainless steel, or the like materials.

Upon placement of the first open end of the inner tube member 14 onto the inlet tubular extension section 36, a first ferrule 79 having an inner wall 81 adapted for placement over a portion the first open end of the inner tube member 14 is positioned over inlet tubular extension section, preferably over the annular rib 77. In the preferred embodiment 13 the ferrule is a collet having a cylindrical inner surface and a conical outer surface. The ferrule includes opposing tabs 80 protruding from its outer surface. The tabs are constructed to engage corresponding slots 72 located on the annular collar 71. An outer wall 83 of the first ferrule 79 is sized for placement with a first open end of the outer tube member 12. In a preferred embodiment the first ferrule 79 include kerf cuts 85 that allow for ease of compression of the first ferrule 79 onto the inner tube member 14 when first metal collar member 87, having an inner surface 89 constructed and arranged to thread onto the annular collar 71, crimps the first open end of the outer tube member 12 between the first ferrule 79 and the collar member 87. Further, the collar member 87 engages the first ferrule 79 providing a frictional engagement to seal the first open end of the inner tube member 14 to the inlet tubular extension section 36 allowing the hose assembly to be pressurized with water without leakage. The female inlet coupler 18 employs conventional threads commonly employed for the water hose fitting.

The female inlet coupler 18 may include a hex shaped wall 19 to allow for ease of holding the inlet coupler 18 while the inner tube member 14 is being installed on the inner tubular extension section 36, as well as the tightening of the second collar member 87 so as to prevent marring of the coupler member 14 during installation or removal. The use of a box shaped, triangular shaped or the like shaped wall to provide a gripping surface is contemplated by this disclosure.

The male outlet coupler 16 is formed from a metal threaded coupling section 20 housing a flow restrictor 21, a metal annular coupler 24, and a metal outlet tubular extension section 32 extending therefrom. A flow thru aperture 31 is centrally disposed along a longitudinal axis of the male outlet coupler 16 having a handle 61 operated ball valve for use in restricting the flow of water. The end 37 of the outlet tubular extension section 32 is insertable into a first open end of the inner tube member 14 for securement thereto. In a preferred embodiment, the end 37 includes a barb 39 having an angular face that allows for ease of inserting into the second open end of the inner tube member 14 yet provides frictional engagement to the interior wall of the inner tube member 14. In addition to the barb 39, the use of an annular rib 41 enhances the engagement between the inner tube member 14 and the tubular extension section 32 providing a watertight seal. Upon placement of the second open end of the inner tube member 14 onto the tubular extension section 32, a second ferrule 43 having an inner wall 45 adapted for placement over the second open end of the inner tube member 14 that is positioned over the rib 41.

In the preferred embodiment the ferrule is a collet having a cylindrical inner surface and a conical outer surface with one or more kerf cuts along its length when squeezed. The ferrule includes opposing tabs 50 protruding from its outer surface. The tabs are constructed to engage corresponding slots 26 located on the annular collar 24. An outer wall 47 of the second ferrule 43 is sized for placement within the second open end of the outer tube member 12 thereon. In a preferred embodiment the second ferrule 43 include cuts 49 that allow compression of the ferrule 43 onto the inner tube member 14 by use of a collar member 51 having an inner surface 53 constructed and arranged to thread onto the annular coupler 24 thereby crimping the outer tube member 12 member between the ferrule 43 and the collar member 51. Further, the second metal collar member 51 engages the ferrule 43 sealing the inner tube member 14 to the outlet tubular extension section 32 allowing the hose assembly to be pressurized with water up to 250 psi. The collar member 51 can include an outer surface texture to allow ease of assembly upon threading of the collar member 51 to the annular coupler 24. The threaded coupler section 20 employs conventional threads commonly employed for a water hose. The flow thru aperture 31 allows for uninterrupted water passage and the threaded coupling section 20 includes an integrally formed flow restrictor 21 that is capable of preventing the flow of water via an on/off valve 33, while the male outlet coupler 16 is also connectible to a conventional spray nozzle 25.

The male outlet coupler 16 may include a hex shaped wall 17 to allow for ease of holding the male outlet coupler 16 while the inner tube member 14 is being installed on the outlet tubular extension section 32, as well as the tightening of the second collar member 51 so as to prevent marring of the outlet coupler during installation or removal. The use of a box shaped, triangular shaped or the like shaped wall to provide a gripping surface is contemplated by this disclosure.

During assembly, the outer tube member 12 is attached and connected to the inner tube member 14 only at the first end and second end by the male outlet coupler 16 and the female inlet coupler 18. The outer tube member 12 is otherwise unattached, unconnected, unbonded, and unsecured to the elastic inner tube member 14 along the entire length of the inner tube member 14 between the first end and the second end and thus the outer tube member 12 is able to move freely with respect to the inner tube member 14 along the entire length of the inner tube member 14 when the garden hose expands or contracts.

Figure 6:
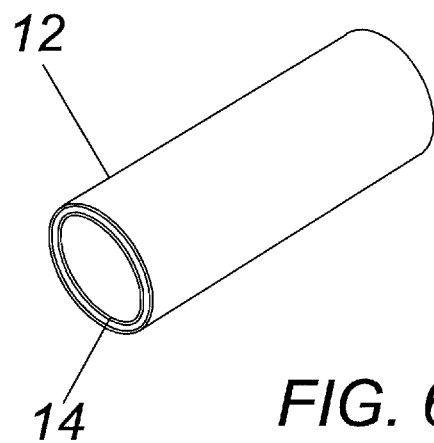
FIG. 6 is a cross sectional view, perspective view of a section of the hose of the present invention taken along line 6-6 in FIG. 4.
Figure 7:
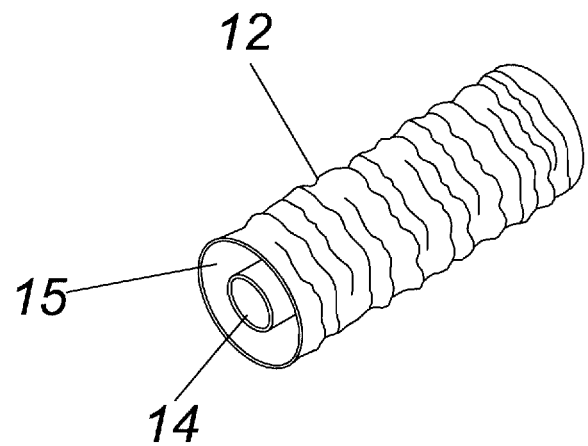
FIG. 7 is a cross sectional view, perspective view of a section of the hose of the present invention taken along line 7-7 in FIG. 2.

The hose 10 of the present invention is illustrated in its contracted condition in FIGS. 1, 2, 7 and 8. In this condition, the inner tube member 14, which is elastic, is in a 17 relaxed contracted condition wherein there are no forces being applied to the inner tube member 14 to expand or stretch it. The amount of water that may reside in the tube in its contracted condition is much less than while in its expanded condition. Also it should be noted that the outer tube member 12 is not in a bonded contact with the inner tube member 14 when the hose is in this contracted condition, there will be a space 15 between the inner tube member 14 and the outer tube member 12. As illustrated in FIG. 7, the thickness of the wall of the inner tube member 14, in the contracted position, is relatively large compared to the thickness of the inner tube member 14, in the expanded position, FIG. 6. The expansion of the elastic inner tube member 14 laterally, is the result of an increase in the water pressure within the inner tube member 14. This increase in water pressure also results in the expansion of the length of the elastic inner tube member 14. The expansion of the inner tube member 14, both laterally and longitudinally, results in a decrease in the wall thickness of the inner tube member 14, an increase in the diameter of the inner tube member 14 thus increasing the volume of water that can flow through the inner tube member 14. This decrease in wall thickness is illustrated in FIG. 6, wherein the inside diameter of the inner tube member 14 has been expanded and extended because of an 18 increase of the water pressure and volume within the inner tube member 14.

Figure 9:
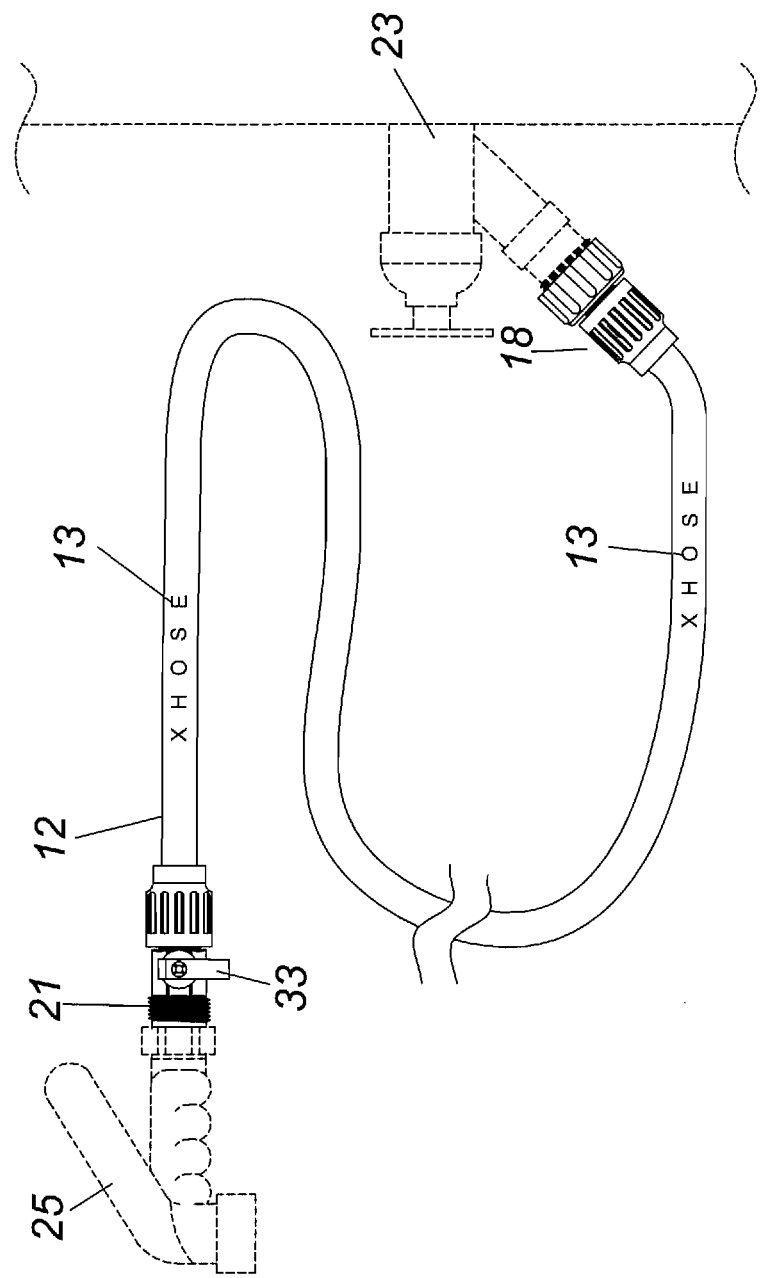
FIG. 9 is a pictorial view of the hose in an expanded state with an integral flow restrictor and a spray nozzle further illustrating viewable indicia on the outer wall.

In the expanded or extended condition, illustrated in FIGS. 4, 6 and 9, the inner tube member 14 is expanded or stretched. In this expanded condition the outer tube member 12 constrains the lateral expansion of inner tube member 14. The outer tube member 12 is also taut, smooth, and relatively flat along its length in this extended condition. Since the outer tube member 12 will not expand laterally or longitudinally beyond the fabric's length and diameter, the actual length and width of the outer tube member 12 determines the maximum length and maximum width of the hose 10 in its expanded condition. Thus the diameter and length of the outer tube member 12 determines the diameter and length of the water hose of the present invention upon the application of water pressure to the interior of the elastic inner tube member 14. This diameter and length of the outer tube member 12 is the final diameter and the final length of the hose 10 when it is in its expanded condition and in use to transport or deliver water.

In a preferred embodiment of the present invention the hose 10 can expand from 2 to 6 times its contracted length upon the introduction of pressurized water into the tube, the pressure would need to be at least 20 psi. For example, in one embodiment a ten foot hose in a contracted 19 condition would automatically expand to 20 feet when pressurize water is supplied to the interior of the inner tube member 14 of the hose. In another embodiment, a ten foot hose in a contracted condition would automatically expand to 60 feet when pressurize water is supplied to the interior of the inner tube member 14 of the hose.

Figure 12:
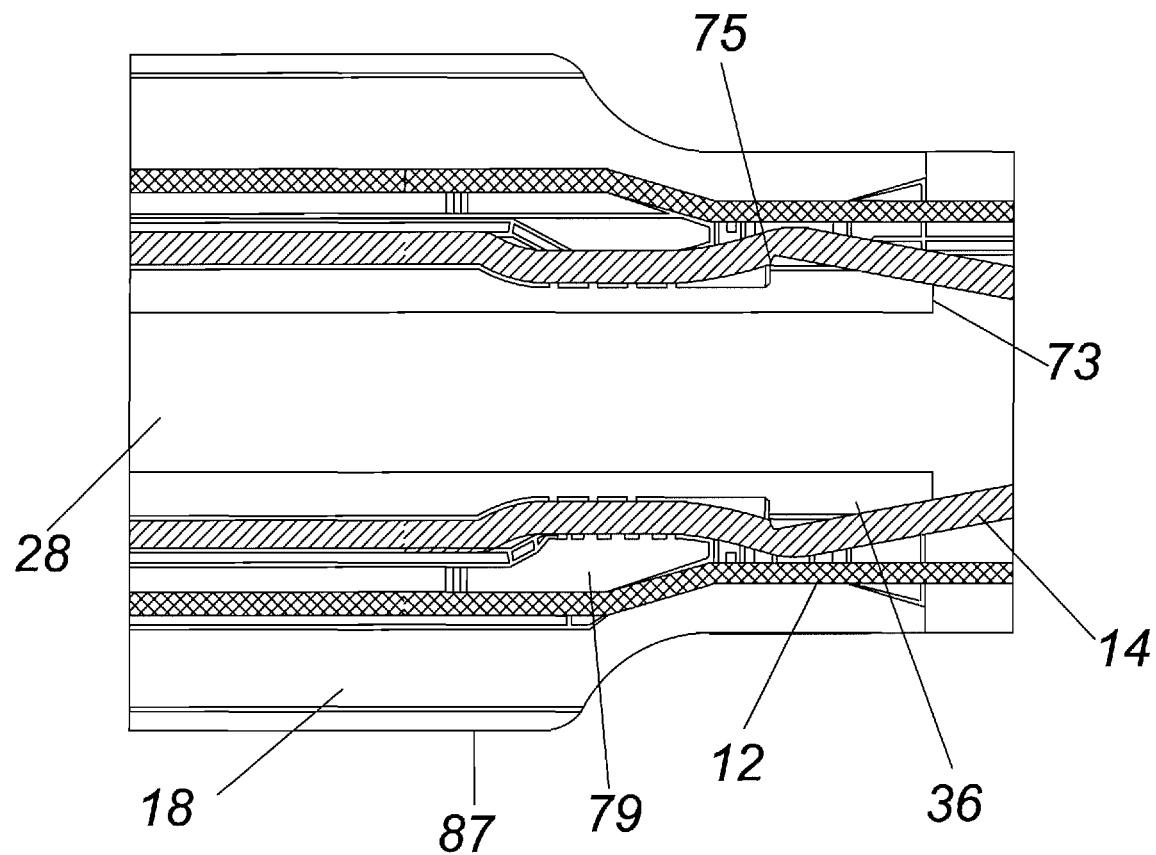
FIG. 12 is a cross section view of the inner and outer hose attached to a coupling.
Figure 14:
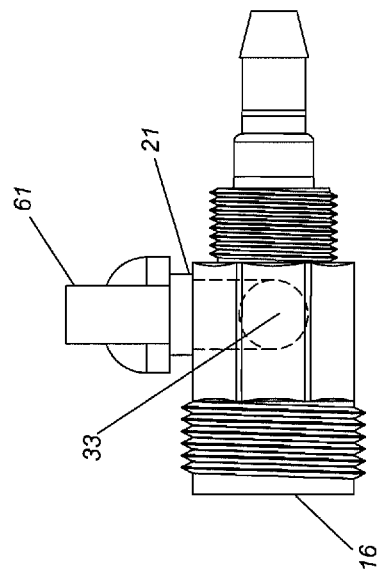
FIG. 14 is a side view of the male outlet coupling with a handle placement to inhibit water flow.
Figure 13:
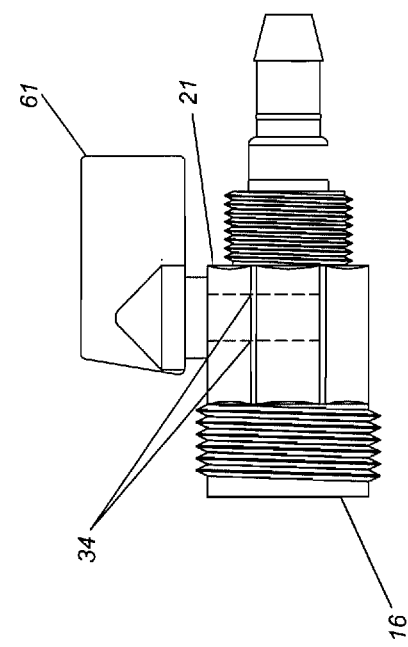
FIG. 13 is a side view of the male outlet coupling with a handle placement to allow water flow.

The water pressure within the hose is accomplished by introducing water under pressure into the inlet of the hose and restricting the flow of the water out of the outlet of the hose by use of an integrally formed flow restrictor. In a preferred embodiment the flow restrictor is formed integral with the fitting as illustrated in FIGS. 12 and 13 wherein a metal on/off ball valve 33 is mounted within the housing for use in restricting the water. Two opposing gaskets 34, preferably polytetrafluoroethylene, form a watertight seal on each side of ball valve 33. When the handle 61 is turned in-line with the flow through aperture the ball valve 33 allows water to pass. When the handle 61 is turned perpendicular to the flow through aperture the ball valve 33 prohibits water flow.

As depicted in FIG. 9, the outlet coupler 16 is preferable attached to a spray nozzle 25. The female inlet coupler 18 of the present invention 10 is secured to a water spigot 23 such as that found on the exterior wall of a building. The flow restrictor 21 is then placed in an off position by 20 rotation of the ball valve 33 so that water cannot pass. When the spigot 23 is opened the pressurized water enters the hose 10 and is prevented from exiting the flow restrictor while in the ball valve is in an off or closed position, wherein the hose is expanded to its predefined length as limited by the outer tube member 12. For instance, a relatively normal pressure for municipal water is about 60 psi wherein the water within the hose is equalized to the same pressure. The flow restrictor 21 is integrally formed to the outlet coupler 16 which can then be directly attached to a spray nozzle 25. The spray nozzle 25 can be a conventional water spray nozzle which varies the rate and spray pattern of water exiting from the nozzle but can also be capable of shutting off the exit of pressurized water. Many spray nozzles are L-shaped so as to be able to be comfortably gripped and used by an individual and have a pivoting on-off handle which operates an internal flow restrictor valve. A spray nozzle provides various amounts of restriction of water at the end of the hose depending on how large the opening in the nozzle is. The smaller the opening in the nozzle, the more the nozzle restricts the release of water at the end of the hose, and the higher the pressure and water volume inside the hose. The larger the opening in the nozzle, the less the nozzle restricts the release of water at the end of the hose, and the lower the pressure and water volume inside the hose. If the 21 flow of water at the other end of the present invention was turned off and totally restricted, the psi inside the inner tube member would be the same as the pressure coming from the house, 60 psi. At this pressure, the inner tube member 14 and the outer tube member 12 in the present invention would expand to its maximum length. As the water at the end of the hose is released, the pressure becomes reduced inside the hose and the hose begins to contract. However, the present invention will remain fully expanded even when the pressure at the opposite end is reduced below the typical pressure of 60 psi coming from a house. In one example, the water pressure coming from the house was 60 psi and the water pressure exiting the nozzle at the other end of the water hose was 35 psi. This 35 psi of pressure inside the elastic inner tube member 14 was enough pressure to cause the inner tube member 14 to expand laterally and longitudinally until its lateral and longitudinal expansion became constrained by the outer tube member 12 and expanded to the maximum length and width of the outer tube member 12. In a preferred embodiment, the hose 10 expands from ten feet in length in its contracted condition to fifty feet in length in its expanded condition. When used in combination with a spray nozzle 25 the flow restrictor 21 allows the user to immediately turn off water to the spray nozzle.

FIG. 12 illustrates how the coupler is secured to the hose wherein the inner tube member is placed over end 73 having an angular face that allows for ease of inserting into the inner tube member 14 yet provides frictional engagement to the interior wall of the inner tube member 14. Barb 75 enhances the engagement between the inner tube member 14 and the tubular extension section 36 providing a watertight seal. Upon placement of the end of the inner tube member 14 onto the inlet tubular extension section 36, a first ferrule 79 is positioned over inner tube member 14. Outer tube member 12 is placed over the outer surface of the first ferrule 79. Collar member 87 is constructed and arranged to thread onto an annular collar thereby sandwiching the outer tube member 12 between the first ferrule 79 and the collar member 87. Further, the collar member 87 engages the first ferrule 79 providing a frictional engagement to prevent the inner tube member 14 from separating from the inlet tubular extension section 36 allowing the hose assembly to be pressurized with water without leakage.

A feature of the present invention is the savings in weight of the hose. The hose 10 in its contracted condition is relatively light, and upon expansion the weight of hose does not increase, only the weight of the water within the hose changes the dynamics. This savings in weight enables the hose of the present invention to be easily carried, easily dragged, easily handled and easily used by anyone who uses the hose but especially by individuals who do not posses exceptional strength or do not want to drag, carry or lug around heavy, bulky, conventional rubber hoses.

Figure 8:
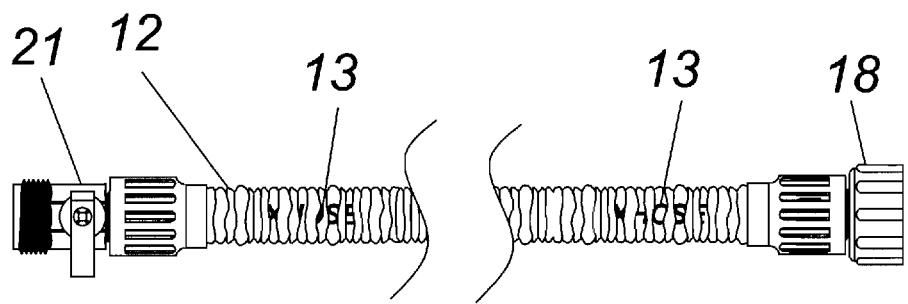
FIG. 8 is a pictorial view of the hose with an integral flow restrictor in a contracted state concealing indicia placed on the outer sidewall.

Another feature of the present invention is that the outer tube member 12 is reduced or decreased in length when there is no pressure within inner tube member 14. With no pressure or volume in the elastic inner tube member 14 the inner tube member automatically contracts. The condition of the outer tube member 12 when the inner tube member 14 is in the contracted condition is illustrated in FIGS. 1, 2, and 8. Because the outer tube member 12 is unsecured to the inner tube member 14 along the entire length of the hose between the first end and the second end, the soft fabric material of the outer tube member 12 can move freely with respect to the inner tube member 14. The fact that the outer tube member 12 can move freely with respect to the inner tube member 14 along the entire length of the hose enables the outer tube member 12 to gather around the outside of the circumference of the inner tube member 14 along its length in the contracted condition when there is no water pressure within the inner tube member 14. An empty hose 10 in the contracted condition is easily stored without the hose kinking or becoming entangled, as most conventional hoses do. A user of the present invention can take hose 10 from a stored condition, secure the hose 10 to a water faucet and turn on the water without the fear of the hose becoming entangled or kinked and without the need to untangle or unkink the hose.

After a conventional water hose is used, the hose is normally carried or dragged back to their place of storage and stored on a reel or coiled up upon themselves and laid on a flat surface. This requires time to carry and drag the hose and to properly store the hose and also requires an expense to purchase the hose reel. The hose 10 of the present invention automatically and quickly contracts to its original size as the inner tube expels excess water wherein the garden hose of the instant invention can be easily folded up, rolled up, or coiled up and stored in any container, even very small containers, or on any surface, thus saving time and expense for the owner of the hose.

The preferred embodiment of the present invention utilizes water to fill and expand the hose 10. Because the inner tube member 14 is elastic it can expand if the water within the tube freezes. For example, if a hose of the present invention were left outside in the winter, the water contained therein would freeze causing an expansion. A conventional hose would split due to the internal expansion, the flexible hose of the present invention would expand because the inner tube member is elastic without damage.

All patents and publications mentioned in this specification are indicative of the levels of those skilled in the art to which the invention pertains. All patents and publications are herein incorporated by reference to the same extent as if each individual publication was specifically and individually indicated to be incorporated by reference.

It is to be understood that while a certain form of the invention is illustrated, it is not to be limited to the specific form or arrangement herein described and shown. It will be apparent to those skilled in the art that various changes may be made without departing from the scope of the invention and the invention is not to be considered limited to what is shown and described in the specification and any drawings/figures included herein.

One skilled in the art will readily appreciate that the present invention is well adapted to carry out the objectives and obtain the ends and advantages mentioned, as well as those inherent therein. The embodiments, methods, procedures and techniques described herein are presently representative of the preferred embodiments, are intended to be exemplary and are not intended as limitations on the scope. Changes therein and other uses will occur to those skilled in the art which are encompassed within the spirit of the invention and are defined by the scope of the appended claims. Although the invention has been described in connection with specific preferred embodiments, it should be understood that the invention as claimed should not be unduly limited to such specific embodiments. Indeed, various modifications of the described modes for carrying out the invention which are obvious to those skilled in the art are intended to be within the scope of the following claims.

What is claimed is:

1. A water hose comprising:
   a flexible elongated outer tube member having a first end and a second end, an interior of said outer tube member being substantially hollow;
   a flexible elongated inner tube member having a first end and a second end, an interior of said inner tube member being substantially hollow, said inner tube being unattached, unconnected, unbonded, and unsecured to said outer tube between said first and second ends;
   an inlet coupler secured to said first end of said inner and said outer tube members, said inlet coupler having a flow thru aperture with an inlet tubular extension section sealed to a first open end of said inner tube member and secured to a first end of said outer tube member;

an outlet coupler secured to said second end of said inner and said outer tube members, said outlet coupler having a flow thru aperture with an outlet tubular extension section sealed to a second open end of said outer tube member;

and a flow restrictor secured to said outlet coupler, whereby said flow restrictor results in an increase in water pressure between said inlet coupler and said outlet coupler upon the introduction of pressurized water through said inlet coupler expanding said inner tube member longitudinally along a length of said inner tube member and laterally across a width of said inner tube member thereby increasing a length of said inner tube member to an expanded condition to length and width permitted by said outer tube member, wherein said inner tube contracts to a decreased or relaxed length when there is a decrease in water pressure between said inlet coupler causing said outer tube member to be gathered into a contracted state.

2. A method of transporting water comprising:

constructing a hose from an elastic, expandable, hollow elongated inner tube having a first end and a second end placed within a non-elastic, bendable, hollow elongated outer tube having a first end and a second end, said inner tube and said outer tube being unattached, unconnected, unbonded, and unsecured;

securing a first coupler to said first end of said inner and said outer tubes;

securing a second coupler to said second end of said inner and said outer tubes with said inner and said outer tubes being secured to each other only at said first and said second ends and unsecured to each other between said first and said second ends;

securing a flow restrictor to said second connector;

wherein said first coupler can be attached to a source of pressurized water whereby said flow restrictor results in an increase in water pressure which automatically expands said inner tube longitudinally along a length and laterally across a width of said inner tube thereby increasing the length and width of said hose to an elongated condition allowing the transfer of water from the first coupler receiving water from the pressurized water source through the second coupler using the pressurized water to maintain the length of the hose in an expanded condition;

wherein the expanded length and width of said hose automatically contracts to a decreased length and width by removing said source of water pressure, whereby said inner tube moves freely with respect to said outer tube when there is no water pressure differential between said first coupler and said second coupler.

3. The method of transporting water of claim 2 including securing an expansion restrictor sleeve to said first end of said inner and said outer tubes;

securing another expansion restrictor sleeve to said second end of said inner and said outer tubes;

whereby when said increase in fluid pressure expands said inner tube, said expansion restrictor sleeve and said another expansion restrictor sleeve restrain the expansion of said inner and said outer tubes and prevent said inner tube from increasing in diameter as a step function.

4. The method of transporting water of claim 2 wherein said outer tube constrains the lateral or radial expansion and the longitudinal expansion of said inner tube upon an increase of said water pressure between said first coupler and said second coupler within said hose.

* * * * *

UNITED STATES PATENT AND TRADEMARK OFFICE
CERTIFICATE OF CORRECTION

| | | |
|---|---|---|
| PATENT NO. | : 9,841,127 B2 | |
| APPLICATION NO. | : 15/440841 | |
| DATED | : December 12, 2017 | |
| INVENTOR(S) | : Michael J. Berardi et al. | |

It is certified that error appears in the above-identified patent and that said Letters Patent is hereby corrected as shown below:

On the Title Page

Item (12) "Berardi" should read -- Berardi et al. --.

(72) Inventor: Michael J. Berardi, Palm Beach Gardens, FL (US)
With:
(72) Inventors: Michael J. Berardi, Palm Beach Gardens, FL (US); Gary Dean Ragner, Gainesville, FL (US)

Signed and Sealed this
Second Day of January, 2024

Katherine Kelly Vidal
*Director of the United States Patent and Trademark Office*